(12) United States Patent
Bengtsson et al.

(10) Patent No.: US 11,134,395 B2
(45) Date of Patent: Sep. 28, 2021

(54) ADAPTIVE ANTENNA CONFIGURATION

(71) Applicant: Sony Group Corporation, Tokyo (JP)

(72) Inventors: Erik Bengtsson, Eslöv (SE); Thomas Bolin, Lund (SE); Olof Zander, Södra Sandby (SE); Zhinong Ying, Lund (SE); Peter C. Karlsson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/621,138

(22) PCT Filed: Jun. 14, 2017

(86) PCT No.: PCT/US2017/037444
§ 371 (c)(1),
(2) Date: Dec. 10, 2019

(87) PCT Pub. No.: WO2018/231217
PCT Pub. Date: Dec. 20, 2018

(65) Prior Publication Data
US 2020/0205012 A1 Jun. 25, 2020

(51) Int. Cl.
*H04W 16/28* (2009.01)
*H04B 7/0413* (2017.01)
(Continued)

(52) U.S. Cl.
CPC .......... *H04W 16/28* (2013.01); *H04B 7/0413* (2013.01); *H04B 7/0617* (2013.01); *H04W 24/02* (2013.01)

(58) Field of Classification Search
CPC .............................. H04B 7/0404; H04W 16/28
See application file for complete search history.

(56) References Cited

U.S. PATENT DOCUMENTS

2011/0212730 A1* 9/2011 Wennstrom ........... H04L 5/0051
455/450
2013/0229307 A1 9/2013 Chang et al.
(Continued)

FOREIGN PATENT DOCUMENTS

CN 104113363 A 10/2014
CN 104243004 A 12/2014
(Continued)

OTHER PUBLICATIONS

International Search Report and Written Opinion of the International Searching Authority, International Application No. PCT/US2017/037444, dated Feb. 12, 2018, 17 pp.
(Continued)

*Primary Examiner* — Hsinchun Liao
(74) *Attorney, Agent, or Firm* — Myers Bigel P.A.

(57) ABSTRACT

Adaptive selection of antenna configurations by wireless nodes that comprise a plurality of antenna elements adapted for a plurality of different antenna configurations. The selection of the antenna configuration is made based on the quality of signal(s) received by the wireless node. The wireless nodes are operable for communication in the mm-wave frequency band and, in specific embodiments, the different antenna configurations include two or more of a wide-coverage area antenna configuration, a Multiple-Input Multiple-Output (MIMO) configuration and a Beamforming (BF) configuration.

19 Claims, 9 Drawing Sheets

(51) Int. Cl.
*H04B 7/06* (2006.01)
*H04W 24/02* (2009.01)

(56) References Cited

U.S. PATENT DOCUMENTS

| | | |
|---|---|---|
| 2014/0086077 A1 | 3/2014 | Safavi |
| 2014/0169490 A1* | 6/2014 | Medbo ................ H04W 52/346 |
| | | 375/267 |
| 2014/0187174 A1 | 7/2014 | Safavi et al. |
| 2015/0092573 A1 | 4/2015 | Zhang et al. |
| 2016/0134015 A1 | 5/2016 | Sonoda et al. |
| 2016/0150418 A1* | 5/2016 | Kang .................. H04W 64/006 |
| | | 455/422.1 |
| 2017/0127421 A1 | 5/2017 | Negus |

FOREIGN PATENT DOCUMENTS

| | | |
|---|---|---|
| CN | 105978601 A | 6/2016 |
| CN | 106134250 A | 11/2016 |
| JP | 2005523639 A | 8/2005 |
| WO | 03090364 A2 | 10/2003 |

OTHER PUBLICATIONS

"Communication Pursuant to Article 94(3) EPC", EP Application No. 17732698.0, dated Sep. 15, 2020, 12 pp.
"Notice of Reasons for Refusal and English language translation", JP Application No. 2019-568647, dated Mar. 30, 2021, 24 pp.
"First Office Action and English language translation", CN Application No. 201780092032.0, dated Jul. 2, 2021, 17 pp.

* cited by examiner

ADAPTIVE ANTENNA CONFIGURATION

CROSS REFERENCE TO RELATED APPLICATION

This application is a 35 U.S.C. § 371 national stage application of PCT International Application No. PCT/US2017/037444, filed on Jun. 14, 2017, the content of which is incorporated herein by reference in its entirety. The above-referenced PCT International Application was published in the English language as International Publication No. WO 2018/231217 A1 on Dec. 20, 2018.

FIELD OF THE INVENTION

In general, embodiments of the invention relate to mobile telecommunications and, more particularly, methods, apparatus, computer program products and the like for adaptive antenna configuration of wireless nodes for operation in the mm-wave frequency band.

BACKGROUND

Future radio communications, such as NR (New Radio) or 5G ($5^{th}$ Generation) wireless communication, will rely on the millimeter (mm)-wave frequency spectrum for communication. Operation of radio communications in the mm-wave frequency band is attractive as the available bandwidth is significantly larger than in conventional frequency bands. In 5G communication is divided into two frequency spectrums; communication below 6 GHz (Giga Hertz) and communication above 6 GHz. For communication above 6 GHz, the wavelength is extremely short, for example, for a wavelength of 28 GHz the wavelength is 1 cm (centimeter), which means that antenna elements in the User Equipment (UE, also referred to herein as a mobile device, mobile terminal or the like) become physically small, in the order of 5×5 mm in size. The smaller antenna has a corresponding small aperture (i.e., opening to the air), which needs to be compensated for by use of multiple antenna elements (e.g., four or eight element antenna modules). However, use of multiple antenna elements results in the need for beam management and beam synchronization. In specific scenarios the complicated process of beam management can be minimized and, in some instances, avoided altogether. However, in other specific scenarios beam configuration is less than optimal.

From a hardware perspective different antenna implementations have been proposed. The implementations actually selected for use in future wireless communication systems may depend on various factors, such as but not limited to, frequency of operation, bandwidth of the transmitted signals, cost, power consumption and the like. The wide bandwidth available in the mm-wave frequency spectrum presents unique challenges, in that, the analog-to-digital converter (ADC) or digital-to-analog converter (DAC) sampling rate needs to be twice the bandwidth; resulting in GHz sampling rates. Such high frequency sampling rates leads to high current consumption in the UE.

In conventional wireless communications, a single antenna element is used at the source, and another single antenna element is used at the destination. Such in the case when a single antenna element (or a few antenna elements) are used in an omni-directional pattern. However, in some cases, use of a single antenna element gives rise to problems with multipath effects. When an electromagnetic field (EM field) is met with obstructions such as hills, buildings, and the like, the wave fronts are scattered, and thus they take many paths to reach the destination. The late arrival of scattered portions of the signal causes problems such as fading, cut-out, and intermittent reception. In digital wireless communications systems such scattering can cause a reduction in data speed and an increase in the number of errors. The use of two or more antenna elements, along with the transmission of multiple signals at the source and the destination, for example, Multiple-Input Multiple-Output (MIMO) antenna technology, utilize properties related to multipath wave propagation, and take advantage of this effect. In MIMO, the antenna elements at each end of the communications circuit are combined to minimize errors and optimize data speed.

In mobile radio communication the usage of multiple antenna elements for transmission and/or reception can be used for directional signal transmission or reception, otherwise referred to herein as "beamforming". Beamforming may be analog or digital. In digital beamforming each individual antenna element in the antenna array has an RF (Radio Frequency) transceiver, which is fed by an individual baseband signal. The individual baseband signals contain information of multiple signals, super-positioned, so that, simultaneous multiple beams can be achieved in different directions. The combination of the information contained in the individual baseband signal is performed within the digital domain. Thus, in digital beamforming, as many ADC converters as there are beams are needed. In analog beamforming individual analog physical phase shifters are implemented in conjunction with each antenna element either before or after the power allocation in the downlink (i.e., receive path). Thus, in the analog realm beamforming of a single beam is attained based on the relative phase set for each of the individual antenna elements in the antenna array. Additionally, beamforming may be hybrid, meaning that directional signal transmission and/or reception can be achieved by a combination of both digital and analog techniques. Hybrid beamforming may be a better option to enable low power communication.

Therefore, a need exists to develop systems, apparatus, methods and the like for antenna configuration selection when a wireless node, UE or access point, is equipped with a plurality of antenna elements adapted for a plurality of different antenna configurations.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, apparatus, systems or the like for open loop selection of antenna configuration by wireless nodes that comprises a plurality of antenna elements adapted for a plurality of different antenna configurations. The selection of the antenna configuration is made based on the quality of signal(s) received by the wireless node. The quality of the signal may be defined in terms of the strength/power of the signal and/or the channel richness. In additional embodiments of the invention, the selection of the antenna configuration may be based on the mobility status of the wireless node and/or the state of interference affecting the wireless node. In specific embodiments of the invention, the wireless nodes are operable for communication in the mm-wave frequency band and, as such, the different antenna configurations include two or more of an omni-directional antenna configuration, a Multiple-Input Multiple-Output (MIMO) configuration and a Beamforming (BF) configuration.

Each of the different antenna configurations have different characteristics which effect the rate, robustness and/or power efficiency of communication for different network scenarios. These characteristics, include, but are not limited to, (a) directional properties of the antenna, (b) array gain obtained by correlated antenna elements within an antenna array, (c) the ability of the antenna configuration to support multiple beams simultaneously or multiple modes comprising two or more antenna elements simultaneously (i.e., polarization, uncorrelation and/or directivity of the antenna elements) and (d) the number of antenna elements and the degree of uncorrelation of the antenna elements.

A method for antenna configuration of a wireless node defines first embodiments of the invention. The wireless node includes a plurality of antenna elements adaptive for a plurality of antenna configurations. The method includes receiving a first wireless signal with a first antenna configuration and selecting a second antenna configuration from amongst the plurality of antenna configurations for transmitting and/or receiving a second wireless signal with at least one of the antenna elements based on a quality of the first wireless signal.

In specific embodiments of the method, the first antenna configuration is further defined as a wide-coverage area antenna configuration, such as an antenna configuration targeting omni-directional coverage.

In other specific embodiments of the method, the first and second antenna configurations have substantially the same coverage angles. While in other specific embodiments of the invention, either the coverage angles of the second antenna configuration are substantially a sub-group of the coverage angles of the first antenna configuration or the coverage angles of the first antenna configuration are substantially a sub-group of the coverage angles of the second antenna configuration.

In specific embodiments of the method, the plurality of antenna configurations include at least two of a wide-coverage area antenna configuration, a Multiple Input Multiple Output (MIMO) antenna configuration and a beamforming antenna configuration. In such embodiments of the method, the wide-coverage area antenna configuration implements one or at most a few of the plurality of antenna elements configured in a wide-coverage area pattern. The MIMO antenna configuration implements a plurality of uncorrelated antenna elements that are configured to support multiple wireless data signals simultaneously over a single wireless channel by multipath propagation. The beamforming antenna configuration implements a plurality of correlated antenna elements that are configured to transmit and receive same data with phase offset.

In specific embodiments of the method, selecting the antenna second configuration further includes selecting the antenna configuration based the quality of the first wireless signal, wherein the quality of the signal is defined by one or more of the strength/power of the signal and/or the channel richness of the signal.

In other specific embodiment of the method, the selecting the second antenna configuration may be further based on at least one of the mobility status of the wireless node and/or the state of the interference affecting the wireless node.

Moreover, in additional specific embodiments the method includes initiating, at a UE, network access with a base station using a wide-coverage area antenna configuration. In such embodiments of the method receiving the first signal further includes receiving the first signal using the wide-coverage area antenna configuration.

In still further specific embodiments of the method, selecting the antenna configuration further comprises determining the quality of the signal by determining whether a quality of the signal meets or exceeds a signal quality threshold. In specific embodiments of the invention, signal quality may be further defined as signal strength, although in other embodiments, other factors such as Signal-to-Noise Ratio (SNR), Signal to Interference plus Noise Ratio (SINR), Bit Error Rate (BER) or the like may define signal quality. In such embodiments of the method, selecting the antenna configuration may further include, in response to determining that the quality of the signal fails to meet or exceed the signal quality threshold, setting an array antenna configuration and executing a beam management procedure. In additional embodiments of the method, selecting further includes, in response to setting the antenna configuration and executing the beam management process, determining if the channel supports a single beam or multiple beams. If the channel supports multiple beams, multiple beams with different data streams are managed and, if the channel does not support multiple beams, a single beam with a single data stream is managed. In still further related embodiments of the method, selecting the antenna configuration further includes, in response to determining that the quality of the signal meets or exceeds the predetermined signal quality threshold, setting a Multiple Input Multiple Output (MIMO) antenna configuration and determining if the channel supports MIMO. If the channel supports MIMI, MIMO transmissions continue and, if the channel does not support MIMO, Single Input, Single Output (SISO) transmissions ensue.

A wireless node apparatus defines other embodiments of the invention, the wireless node, which may be a UE or an access point/BS, includes a processing device, a memory and a plurality of antenna elements adaptive for a plurality of antenna configurations. Additionally, the wireless node includes an antenna configuration selection module that is stored in the memory and executable by the processor. The antenna configuration selection module is configured to select an antenna configuration from amongst the plurality of antenna configurations for transmitting and/or receiving a second wireless signal with at least one of the antenna elements based on a quality of a received first wireless signal.

In specific embodiments of the wireless node apparatus the plurality of antenna configurations comprise at least two of a wide-coverage area antenna configuration, a Multiple Input Multiple Output (MIMO) antenna configuration and a beamforming antenna configuration. In such embodiments of the method, the wide-coverage area antenna configuration implements one or at most a few antenna elements and configured in a wide-coverage area pattern. The MIMO antenna configuration implements a plurality of uncorrelated antenna elements that are configured to support multiple wireless data signals simultaneously over a single wireless channel by multipath propagation. The beamforming antenna configuration implements a plurality of correlated antenna elements that are configured to transmit and receive same data with phase offset.

Thus, objects, features, aspects and advantages of the present invention include, but are not limited to, selecting an antenna configuration from amongst a plurality of available antenna configurations based on the quality of a received wireless signal. Such an open loop selection process eliminates the need to include other network nodes in the antenna configuration selection process.

Additional objects, features, aspects and advantages of the present invention provide for selecting the antenna configuration so as to optimize the rate (e.g., capacity), robustness and power efficiency (e.g., current consumption) of the communication for different network scenarios. In this regard, the present invention balances the need for acceptable signal quality with the need to conserve battery power.

In still further objects, features, aspects and advantages of the present invention are realized by selection of an antenna configuration that results in improved Signal-to-Noise Ratio (SNR), Signal to Interference plus Noise Ratio (SINR), and/or Bit Error Rate (BER).

Moreover, objects, features, aspects and advantages of the present invention provide for selecting an antenna configuration based on the mobility status of the wireless node and/or the interference state affecting the wireless node and/or so as to optimize (i) the directional properties of the antenna elements, (ii) the array gain property obtained by correlated antennas in an antenna array, (iii) the ability of the antenna configuration to support multiple beams simultaneously and/or (iv) the number of antenna elements and the level of uncorrelation of the antenna elements.

Various other objects, features, aspects, and advantages of the present invention will become more apparent from the following detailed description of preferred embodiments of the invention.

Thus, systems, apparatus, methods, and the like herein described in detail below provide for selection of antenna configuration by wireless nodes that comprise a plurality of antenna elements adapted for a plurality of different antenna configurations. The selection of the antenna configuration is made based on the quality of signal(s) received by the wireless node. In specific embodiments of the invention, the wireless nodes are operable for communication in the mm-wave frequency band and the different antenna configurations include two or more of a wide-coverage area antenna configuration, a Multiple-Input Multiple-Output (MIMO) configuration and a Beamforming (BF) configuration.

BRIEF DESCRIPTION OF THE DRAWINGS

Figure 1:
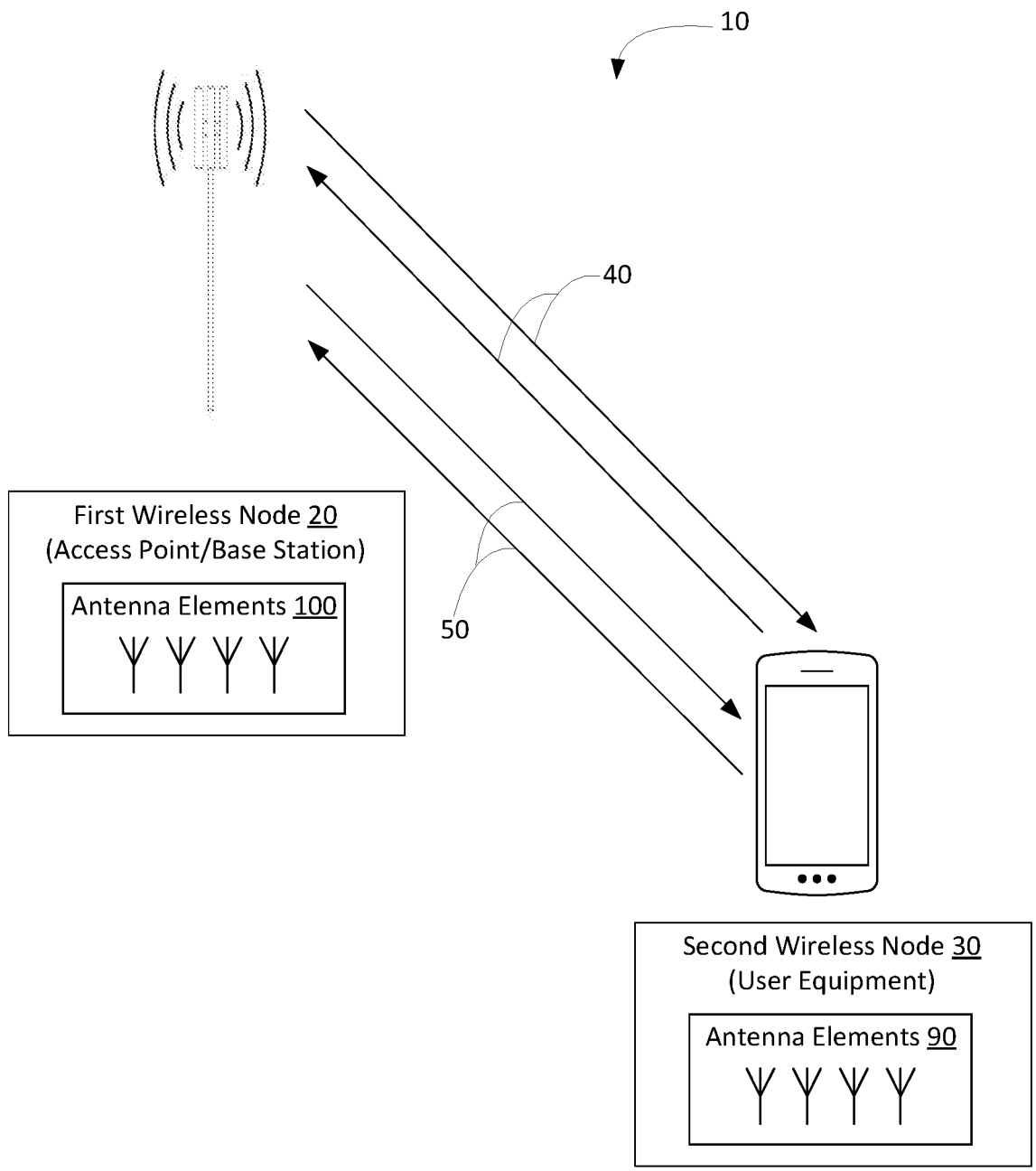
Figure 2:
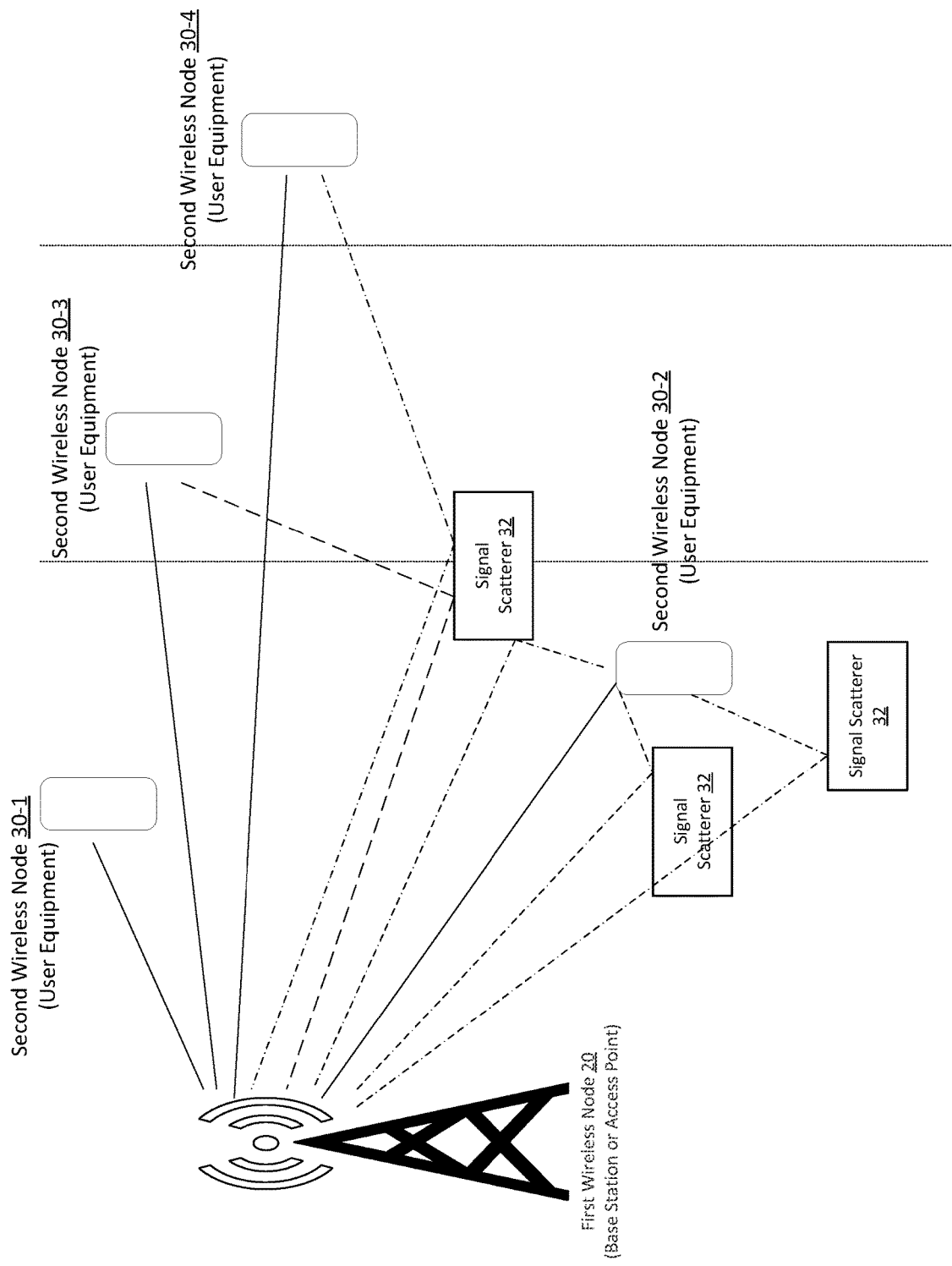
Figure 3:
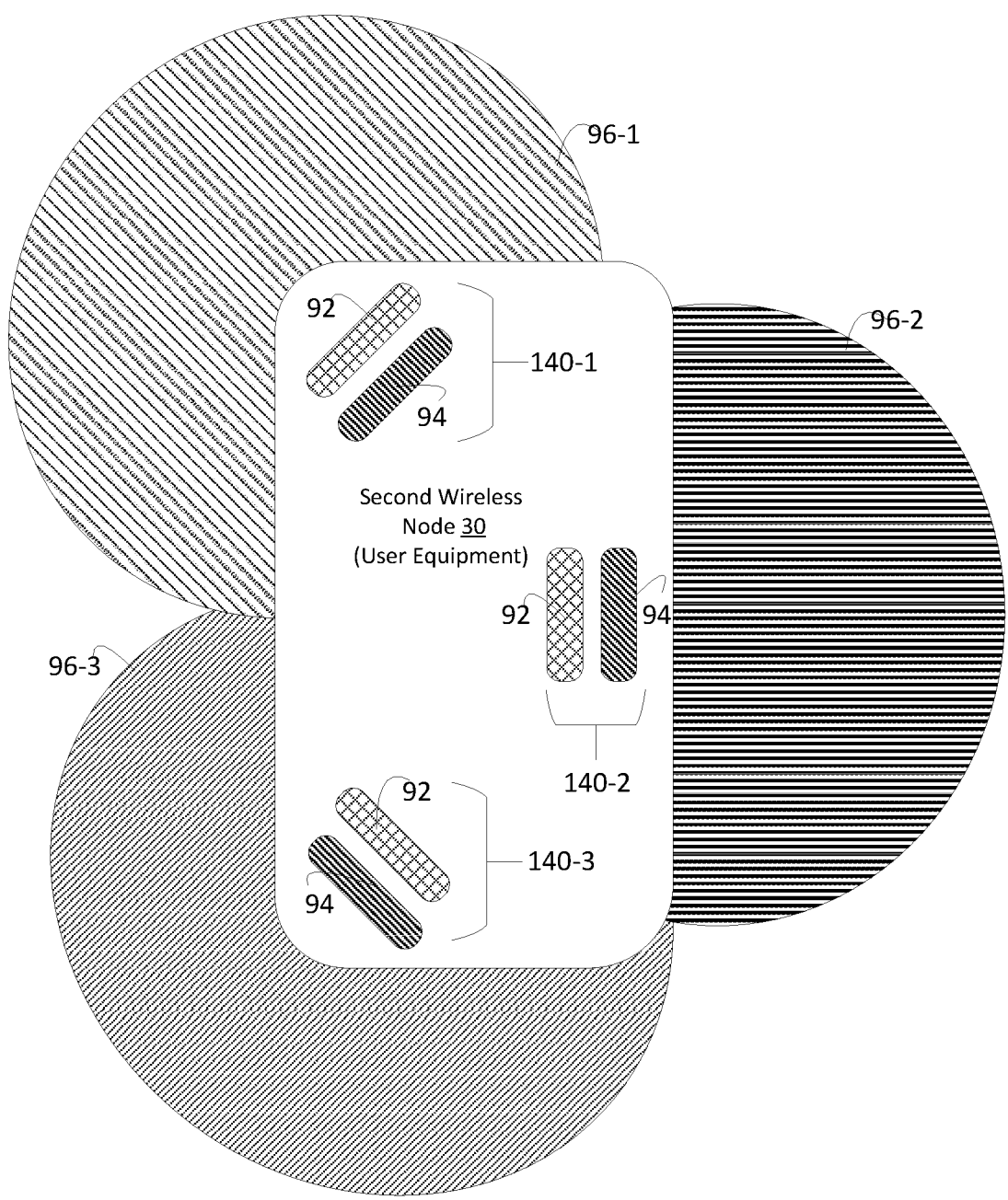
Figure 4:
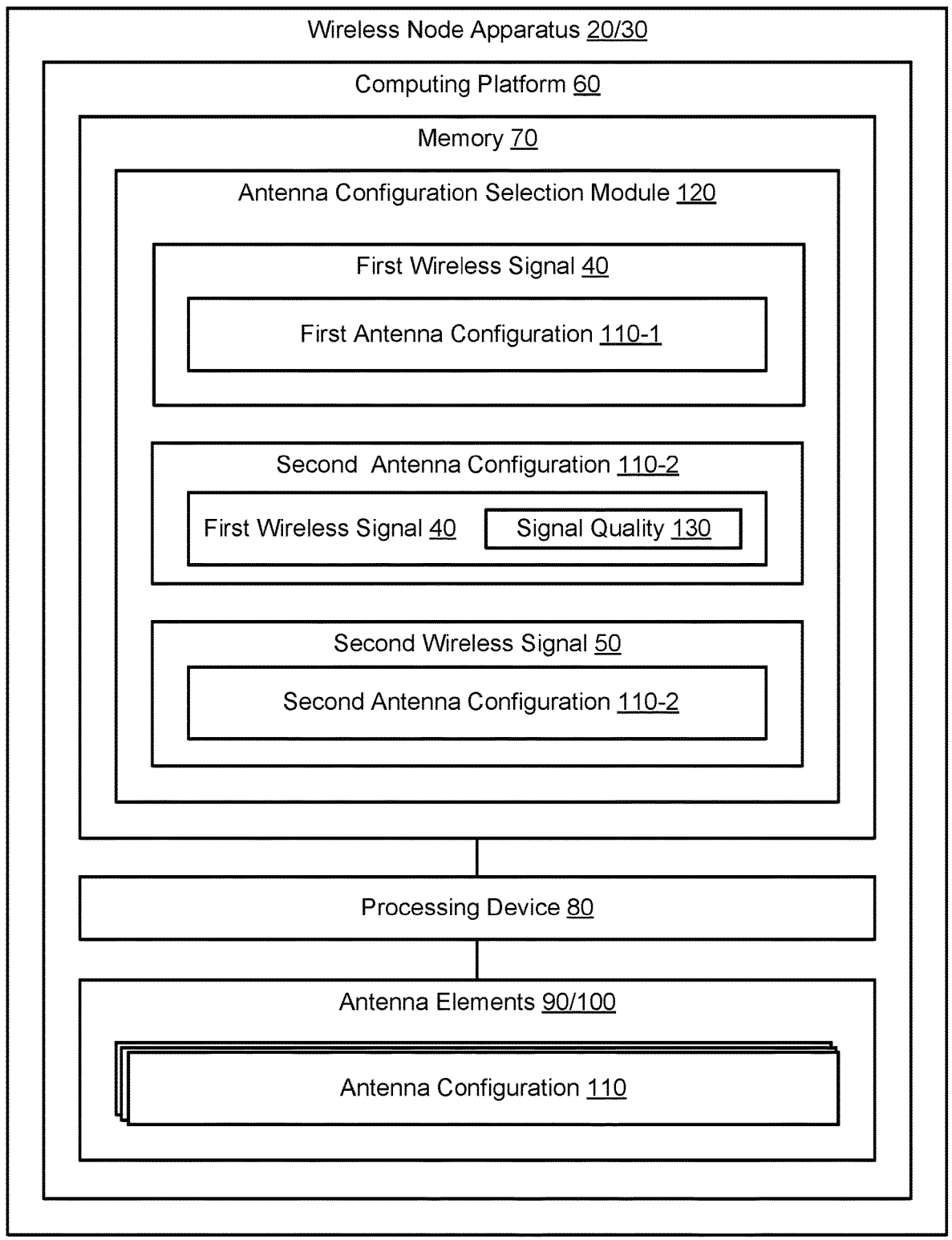
Figure 5:
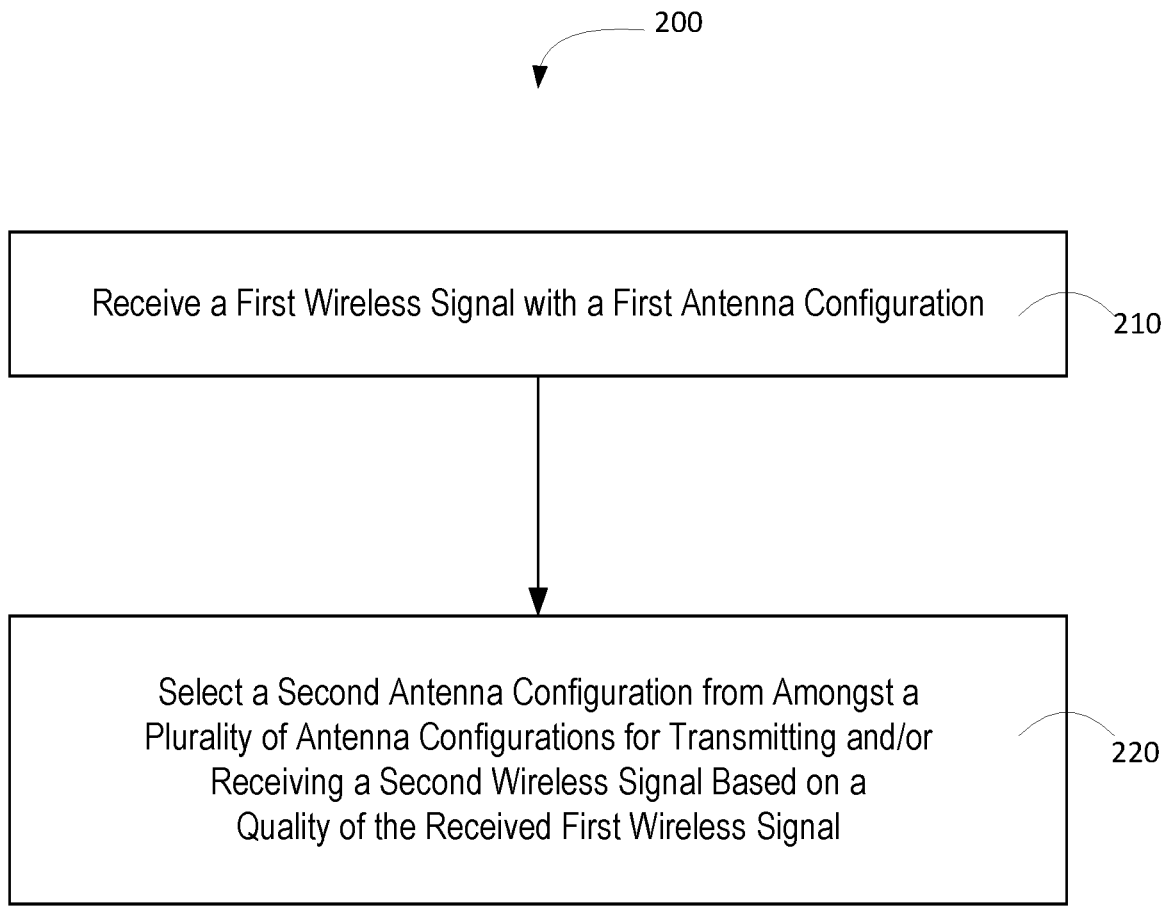
Figure 6:
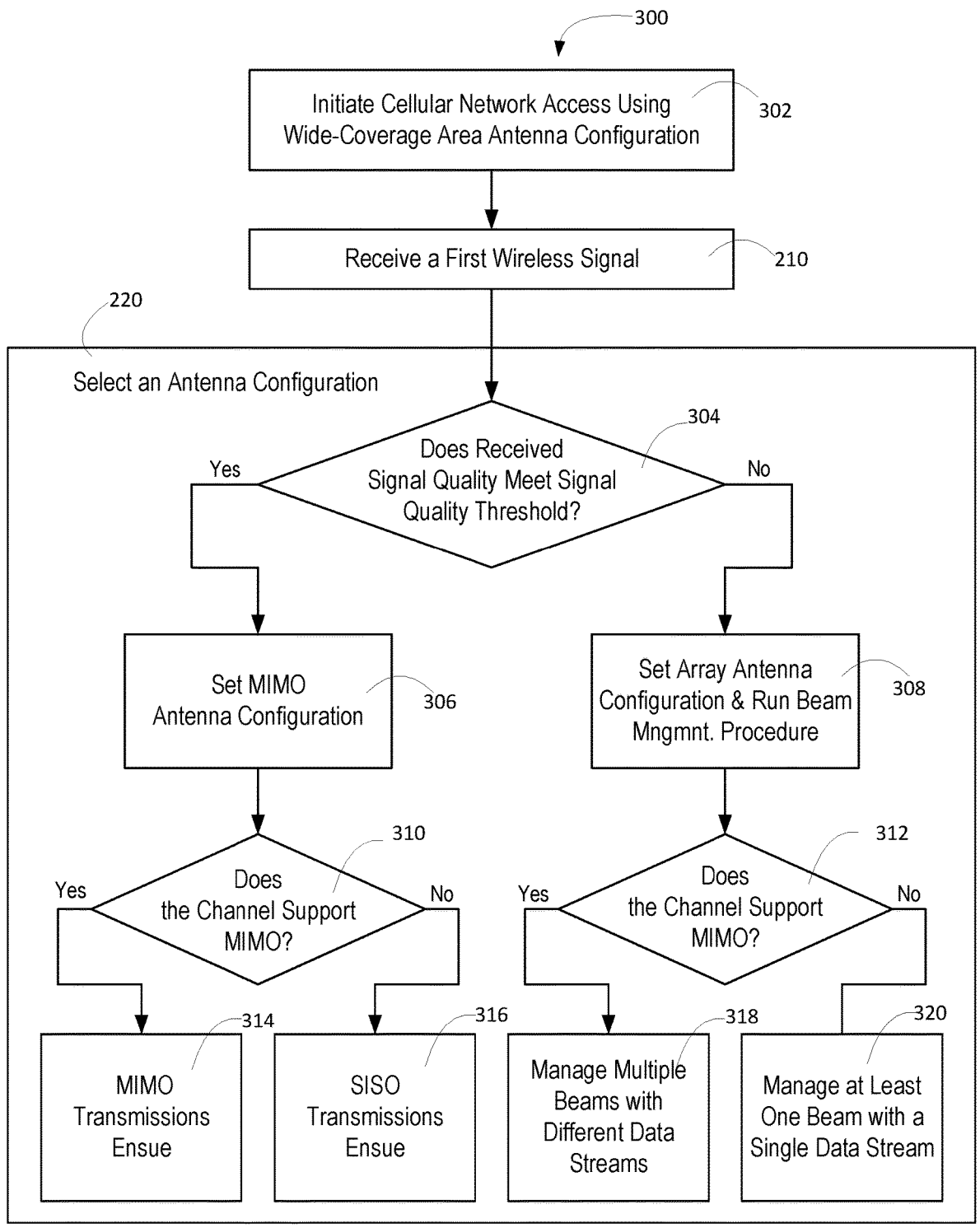
Figure 7:
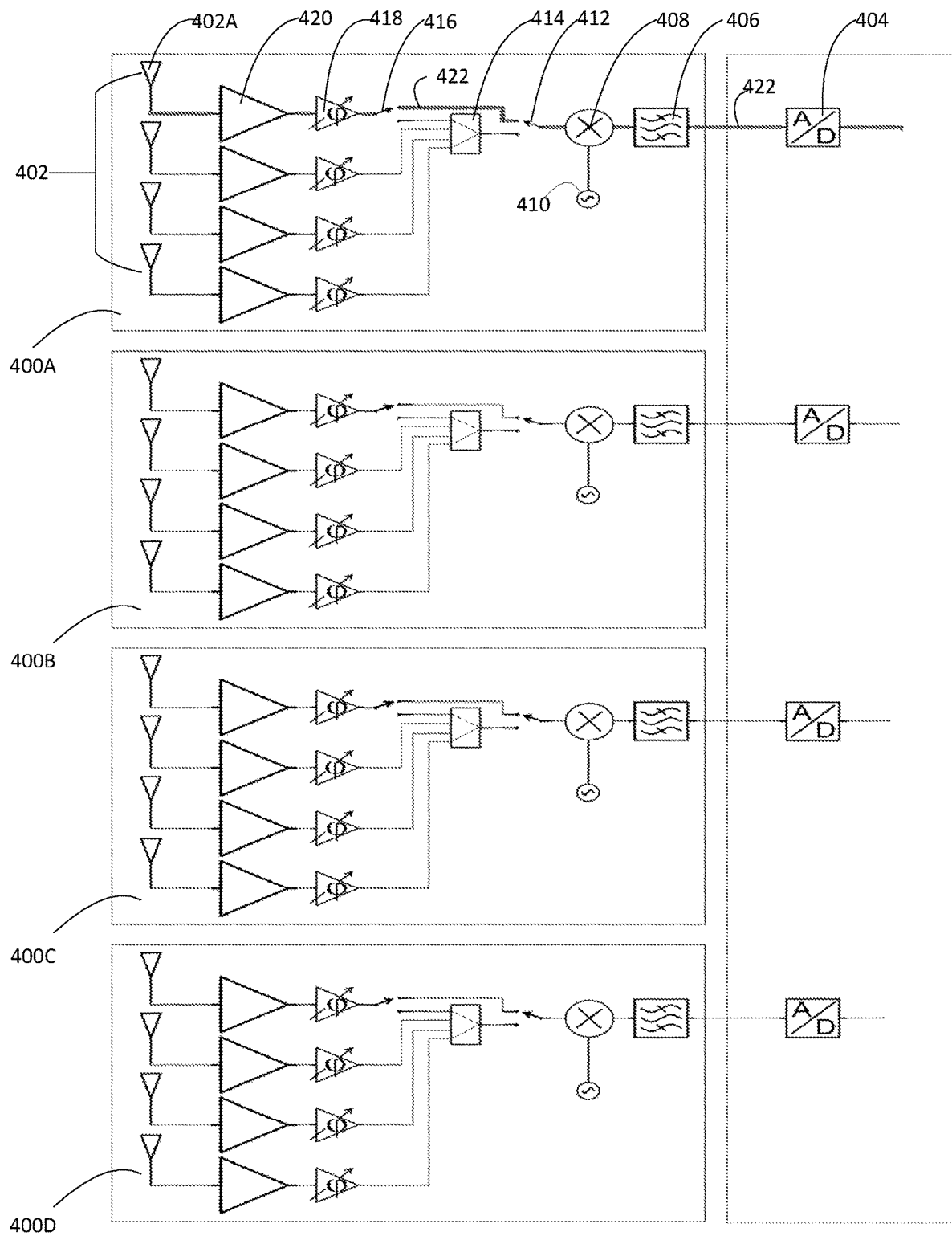
Figure 8:
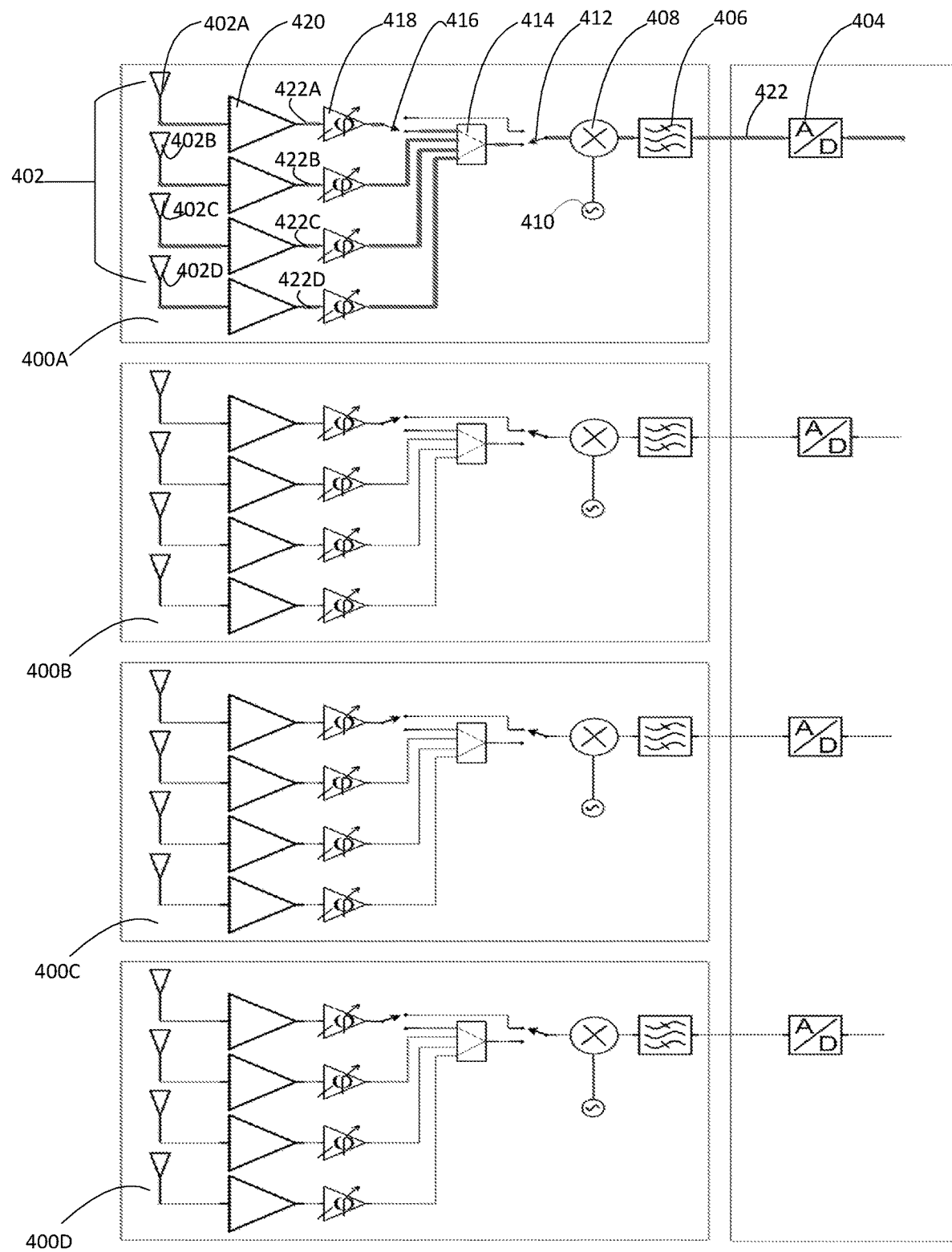
Figure 9:
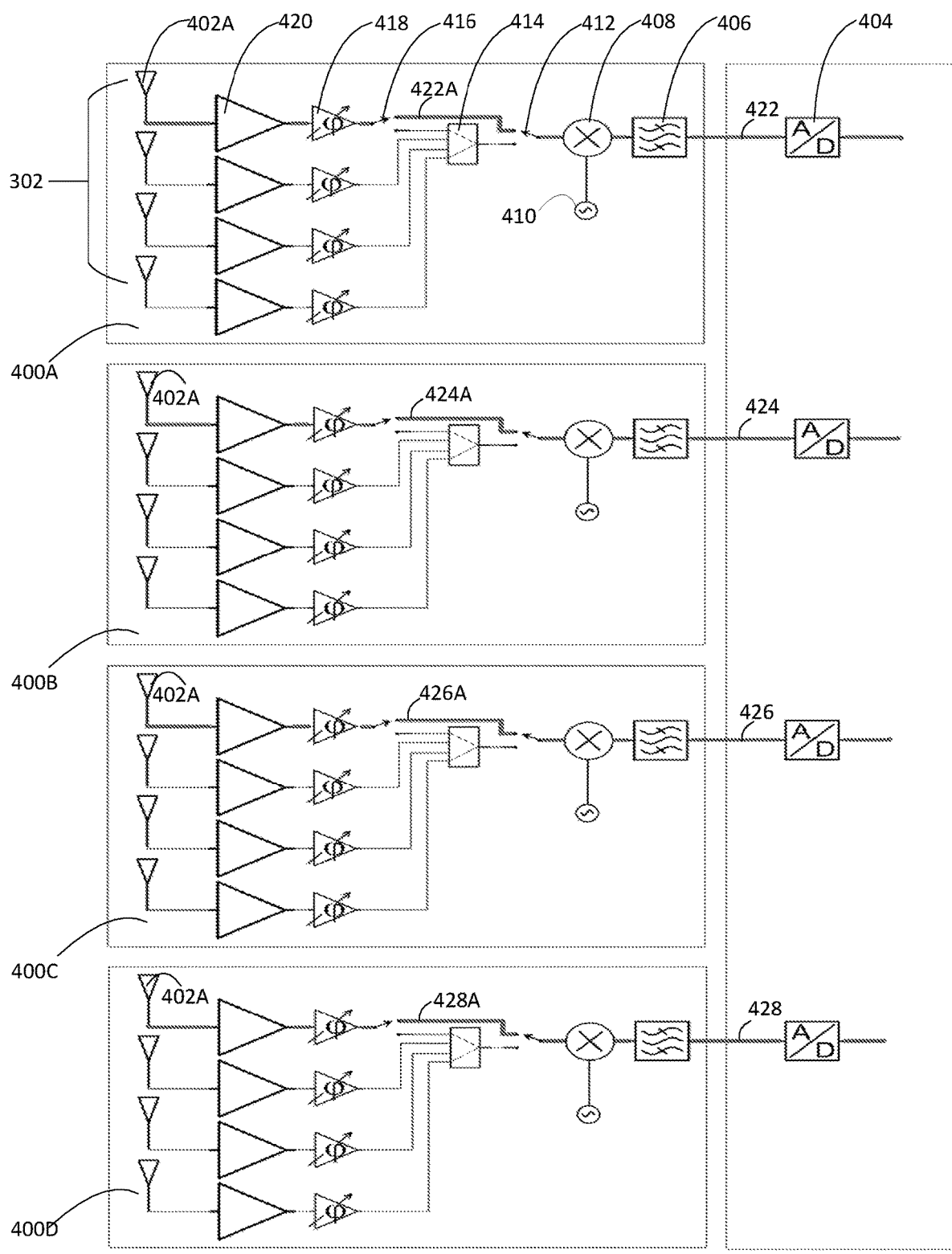

Having thus described embodiments of the invention in general terms, reference will now be made to the accompanying drawings, where:

FIG. 1 is a schematic diagram of a wireless environment configured for adaptive antenna configuration, in accordance with embodiments of the present invention;

FIG. 2 is a schematic diagram of a wireless environment highlighting various wireless nodes/UEs in different signal quality states, in accordance with embodiments of the present invention;

FIG. 3 is a schematic diagram of a UE having various correlated and uncorrelated antenna elements; in accordance with embodiments of the present invention;

FIG. 4 is a block diagram of a wireless node configured for adaptive antenna configuration of a plurality of antenna elements, in accordance with embodiments of the present invention;

FIG. 5 is a flow diagram of a method for antenna configuration of a plurality of antenna elements at a wireless node, in accordance with embodiments of the present invention;

FIG. 6 is a more detailed flow diagram of a method for adaptive antenna configuration of a plurality of antenna elements at a wireless node, in accordance with embodiments of the present invention;

FIG. 7 is a schematic diagram of antenna modules/groupings in a wireless node adapted for a wide-coverage area antenna configuration, in accordance with embodiment of the present invention;

FIG. 8 is a schematic diagram of antenna modules/groupings in a wireless node adapted for analog beamforming antenna configuration, in accordance with embodiments of the present invention; and FIG. 9 is a schematic diagram of antenna modules/groupings in a wireless node adapted for MIMO antenna configuration, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A wireless node as used herein, may refer to user equipment ("UE"), such as a mobile terminal/device, an access point ("AP") or a base stations ("BS"), otherwise referred to as an eNodeB (eNB), gNodeB (gNB) or the like. For the purpose of sending or receiving data, the UE may connect to a wireless local area network ("WLAN") or a mobile communication network (including evolution of 3GPP) LTE releases and $5^{th}$ Generation ("5G") New Radio (NR) releases) comprising a plurality of APs and/or BSs.

As discussed in detail herein, the present invention provides open loop antenna configuration of a wireless node that includes a plurality of antenna elements adapted for a plurality of different antenna configurations. In the open loop methodology the wireless node in which the antenna elements reside determines which antenna configuration to implement without assistance from any other wireless nodes. For example, a UE determines/selects an antenna configuration on its own, absent information or assistance in the determination/selection from an AP or BS. Similarly, an AP or BS may determine/select an antenna configuration, absent information or assistance in the determination/selection from the UEs.

According to specific embodiments of the invention, the different antenna configurations may include, but are not necessarily limited to, wide-coverage area antenna configuration, MIMO antenna configuration and beamforming antenna configuration. Thus, embodiments of the present invention are especially suited for wireless communication in the mm-wave frequency band and, especially communication above 6 GHz, e.g., 28 GHz communication.

In general, different antenna configurations may apply to different scenarios. For example, for some UEs low power consumption may be the overriding aspect, while in other UEs low latency may be the overriding aspect.

Additionally, on a base station level, different physical areas within the network may have different needs and it is important that the communication protocols take all these needs/aspects into account. For example, low latency may be supported by instantaneous beam sweep enabled by digital beamforming at the BS or the UE. In this regard, a UE or a BS configured for digital beamforming is capable of supporting any beam management option, while such is not the case for analog or hybrid beamforming.

For different network scenarios there may also be different options for how to perform optimal communications with a wireless network. These different options may include configuration of the antenna at the UE level. In strong signal conditions, such as when the UE is proximate in location to the base station, a UE antenna configuration that enables a wide-coverage area may be advantageous; especially in those instances in which the UE and the base station are in direct line-of-sight. While in scenarios that exhibit rich scattering an antenna configuration in which the individual antenna elements are uncorrelated, such as a MIMO antenna configuration, is preferred. In still further scenarios, the antenna gain from correlated antenna elements, such as a beamforming antenna configuration, can improve rate, coverage and/or current consumption.

Referring to FIG. 1 a schematic diagram is presented of a system 10 for open loop selection of antenna configurations, in accordance with embodiments of the present invention. The system comprises a first wireless node 20, such as an access point or base station and a second wireless node 30, such as a UE. First wireless node 20 and/or second wireless node 30 include a plurality of antenna elements 90, 100, respectively, that is adapted for a plurality of different antenna configurations. First wireless node 20 and/or second wireless node 30 are configured to receive a first wireless signal 40 transmitted from a corresponding one of either the wireless node 30 or the wireless node 20. The first wireless signal 40 is received by the first wireless node 20 with a first antenna configuration.

The first wireless node 20 and/or second wireless node 30 are configured to select a second antenna configuration from amongst the different antenna configurations for transmitting and/or receiving a second wireless signal 50 with the antenna elements 90 or 100. In accordance with embodiments of the present invention, the wireless node 20 and/or the wireless node 30 are configured to make the antenna configuration selection based, at least, on the quality of the received first wireless signal 40. The quality of the received signal may be defined in terms of one or more of the power level, the Signal-to-Noise Ratio (SNR), Signal to Interference plus Noise Ratio (SINR), Bit Error Rate (BER) and/or any other measurement related to signal quality/strength. In this regard, the selection of the antenna configuration is made so that the rate (e.g., capacity), robustness and power efficiency (e.g., current consumption) of the communication is optimized for different network scenarios. In other embodiments of the invention the selection of the antenna configuration is made so as to filter out interference; both self-interference and interference from other wireless nodes/UEs (e.g., selecting beamforming in a rich scattering environment).

In general, the same rate may be obtained by different antenna configurations. Multiple data streams can be obtained by simultaneous beams or MIMO. In the case of simultaneous beams, the beams need to be managed and be separable, this allows for a greater distance between the UE and the BS. In the case of MIMO, there is no need for beam management in the UE, as the antenna elements are uncorrelated and the data streams can be separated by MIMO processing (i.e., configured in MIMO software or the like). Multiple data streams increase robustness and, in some instances, power consumption (i.e., the number of active RF paths equals the number of data streams). However, since UEs typically operate with small apertures, the reach (i.e., maximum distance between UE and BS) is limited. In addition, use of multiple data streams may also put some demand on the environment in terms of scattering richness (i.e., the greater the amount of signal scattering, the greater the MIMO capacity).

For digital beamforming, less antenna elements can be configured depending on how much array gain is needed. Lessening the number of antenna elements also impacts the robustness, since the beam becomes less directed and requires less in terms of beam management.

In specific embodiments of the invention in which first wireless node 20, (i.e., a UE) is selecting the antenna configuration and the first wireless node 20 is proximate in location to the second wireless node 30 (i.e., AP or BS), the first antenna configuration may be defined as a wide-coverage area antenna configuration. The wide-coverage area configuration implements one, or in some instances, a few antenna elements (e.g., 4 or less antenna elements, 6 or less antenna elements, 10 or less antenna elements, 12 or less antenna elements, 20 or less antenna elements or the like), which serves to accelerate the initial access process. The number of antenna elements in the wide-area coverage configuration may be dictated by the frequencies used (i.e., higher frequencies may use more antenna and lower frequencies may use less antenna). Moreover, since the wide-coverage area configuration uses minimal antenna elements and, in some embodiments, a single Analog-to Digital (A/D) converter, minimal current may be obtained with the wide-coverage area configuration. In specific embodiments of the invention, the wide-coverage area antenna configuration may include a configuration that targets an omni-directional pattern. Such an omni-directional pattern may be targeted by the use of multiple antenna modules simultaneously, with each of the modules having a single or, in some instances a few, antenna elements activated.

Once initial access has been made and the signal quality of the first wireless signal 50 has been determined to be sufficiently strong, the first wireless node 20 may activate more antenna elements and a MIMO antenna configuration may selected. As previously discussed, a MIMO antenna configuration comprises multiple antenna elements that are uncorrelated with respect to phase, polarization and amplitude and thus provides for spatial multi-plexing. Based on multiple beams, the MIMO antenna configuration may provide for more than one data stream.

Conversely, in instances in which the signal quality of the first wireless signal 50 is determined to be weak, the wireless node 20 may select beamforming antenna configuration (i.e., configurations with large array gain) to improve SNR or, as a result of spatial filtering of the channel, SINR. In this regard, the more antenna elements in an array of correlated antenna elements the more array gain and the sharper the beam. Similar to the wide-coverage area configuration discussed above, digital beamforming uses minimal antenna elements and multiple A/D converters resulting in time saved from lessened beam management, which also leads to current savings.

Referring to FIG. 2 a schematic diagram is shown of a wireless network environment and, specifically, four different scenarios in which second wireless node 30 (UE) is located differently within the network with respective first wireless node 20 (BS). In the four scenarios shown and described below power consumption, robustness (due to, in some configurations, less demanding beam management) and/or throughput can be optimized based on different antenna configurations.

In the first scenario, the UE 30-1 is proximate to the BS 20 and receives strong signals from the BS 20. One beam is directed from the BS 20 to the UE 30-1 and may have a direct line-of-sight. In such a scenario, in which limited gain is needed due to the proximity of the UE 30-1 to the BS 20, the UE 30-1 is capable of using a single antenna element with coverage in the direction toward the BS 20. Management of the beam from the single antenna element may be applicable; however, the management required may be of the lowest order (i.e., the second wireless node 30-1 (UE) may switch between different antenna modules (as shown in FIG. 3) in order to cover different directions).

In the second scenario, the UE 30-2 is proximate to the BS 20 and receives strong signals from the BS 20; however, signal scatterers 32 (e.g., buildings, trees, and other impediments) are in the vicinity of the UE 30-2, such that the UE 30-2 receives more than one signal from the BS 20 (i.e., a so-called "rich" environment) and, therefore, there is no need for array gain. In such a rich channel scenario, the UE 30-2 can enable a MIMO antenna configuration in which the UE 30-2 activates multiple uncorrelated antenna elements (i.e., multiple data streams). The different antenna elements may receive the same signal components from the BS 20; however, in MIMO each signal component becomes weighted differently and thus, the multiple data streams can be separated.

In the third scenario, the UE 30-3 is further from the BS 20 and thus the signal strength is lower. In such a scenario, beamforming is needed to obtain the signals and, as such, the UE 30-3 activates at least two correlated antenna elements as a means of obtaining some array gain. As shown in the third scenario, UE 30-3 may be in the vicinity of one or more signal scatters 32 and, thus, receives reflected signals coming in from different angles (i.e., different Angle of Arrival (AOA)). In such instances, multiple beams can be directed simultaneously toward the different received signal directions to obtain multiple data streams (i.e., the number of data streams is less than or equal to the number of beams). In this scenario, beam management procedures apply in order to direct the beam(s) toward the BS 20. Additionally, in this scenario, array diversity may be applicable, in which different antenna modules cover different areas (i.e., different AOA). Further, in the third scenario, it may be advantageous to implement more antenna elements to obtain interference rejection (based on narrower beam).

In the fourth scenario, the UE 30-4 is furthest from the BS 20 and, thus, additional antenna elements are needed to obtain a higher array gain. Thus, similar to the third scenario, beamforming is needed to obtain the signals and, as such, the UE 30-4 activates at least two correlated and, typically, more antenna elements as a means of obtaining a higher array gain. In the third and fourth scenarios, the same rate/capacity may result; however, the third scenario involves less beamforming (i.e., less current, in some implementations) and, thus, may be preferred. In addition, the third scenario is more robust as the beams are less directed and, therefore, less overhead is needed in terms of beam management.

Referring to FIG. 3 a schematic diagram is shown of a wireless node (UE 30) having multiple antenna modules, in accordance with embodiments of the present invention. In the illustrated example of FIG. 3, the UE 30 includes three antenna modules 140-1, 140-2, 140-3, which may otherwise be configured as logical groupings with each antenna module disposed within UE 30 so to address different AOAs for reception and different Angles of Departure (AOD) for transmissions. The antenna modules 140-1, 140-2, 140-3 may be disposed in separate modules or may be distributed/attached to different locations of a printed circuit board (PCB) (not shown in FIG. 3) or the like. Each antenna module 140-1, 140-2 and 140-3 can be configured to include correlated antenna elements 92 (for beamforming antenna configurations) and uncorrelated antenna elements 94. Further, each antenna module 140-1, 140-2 and 140-3 has a corresponding antenna pattern 96-1, 96-2, 96-3 that is applicable to both transmission and reception.

Diversity is obtained by selecting an antenna module 140-1, 140-2 and 140-3 that covers the AOA in the direction of the relevant BS beam. Additionally, there may be multiple antenna arrays with correlated antenna elements 92 covering the same direction but with different polarization (e.g. horizontal, vertical or circular). The polarization of each antenna in a system should be properly aligned. Maximum signal strength between wireless nodes occurs when both nodes are using identical polarization.

In a wide-coverage area configuration the antenna module 140-1, 140-2 and 140-3, implemented in unison, may target the ideal scenario of an omni-directional antenna configuration. In the illustrated embodiment of FIG. 3, such a wide-coverage area configuration would implement at least one antenna element from each of the antenna module 140-1, 140-2 and 140-3 and in order to achieve different polarization each of the antenna module 140-1, 140-2 and 140-3 would implement, assuming 2-D modules, at least two antenna elements (i.e., a total of six antenna elements within the UE 30). In specific embodiments of the invention, implementing one antenna element from each antenna module 140-1, 140-2 and 140-3 may provide for the lowest array gain, which depending on signal quality, may be sufficient. However, if the signal quality dictates use of more antenna elements, e.g., increasing to two antenna elements from each antenna module 140-1, 140-2 and 140-3 more array gain can be achieved. In such embodiments, in which each antenna module implements more than one antenna element, a first antenna element may be configured with a wide beam and other antenna elements may be configured with narrower beams.

The uncorrelated antenna elements 94 may be implemented with wide-coverage area antenna configuration (e.g., a single antenna element or a few antenna elements, such as 4 or less antenna elements, 6 or less antenna elements, 10 or less antenna elements, 12 or less antenna elements, 20 or less antenna elements or the like) and the MIMO antenna configuration is obtained by activating one or more antenna elements from more than one of the antenna module 140-1, 140-2, 140-3. While the illustrated example of FIG. 3 shows antenna modules 140-1, 140-2, 140-3 comprising both correlated antenna elements 92 and uncorrelated antenna elements 94, in other embodiments of the invention, antenna modules may solely comprise correlated antenna elements 92 or uncorrelated antenna elements 94. In those embodiments of the invention, in which the modules are correlated modules (i.e., consist entirely of correlated antenna elements), one or a few antenna elements from each of the correlated modules may be implemented for a MIMO antenna configuration.

For multi-beam configuration (such as described in relation to the third and fourth scenarios of FIG. 2) the correlated antenna elements of a single antenna module 140-1, 140-2 or 140-3 may be implemented to generate multi-beams in different directions or, in other embodiments, more than one antenna module 140-1, 140-2, 140-3 is activated depending on the direction of incoming beams.

Referring to FIG. 4 a block diagram is presented of a wireless node apparatus 20, 30, in accordance with embodiments of the present invention. As previously discussed the wireless node 20, 30 may comprise a UE or an APBS. The wireless node 20, 30 includes a computing platform 60 having a memory 70 and at least one processor 80 in communication with the memory. The wireless node additionally includes a plurality of antenna elements 90, 100 adapted for a plurality of different antenna configurations 110.

Memory 70 may comprise volatile and non-volatile memory, such as read-only and/or random-access memory (RAM and ROM), EPROM, EEPROM, flash cards, or any memory common to computer platforms. Further, memory 70 may include one or more flash memory cells, or may be any secondary or tertiary storage device, such as magnetic media, optical media, tape, or soft or hard disk. Moreover, memory 70 may comprise cloud storage, such as provided by a cloud storage service and/or a cloud connection service.

Further, processor 80 may be an application-specific integrated circuit ("ASIC"), or other chipset, processor, logic circuit, or other data processing device. Processor 80 or other processor such as ASIC may execute an application programming interface ("API") (not shown in FIG. 4) that interfaces with any resident programs or modules, such as antenna configuration selection module 120 and routines, sub-modules associated therewith or the like stored in the memory 70 of computing platform 60.

Processor 60 includes various processing subsystems (not shown in FIG. 4) embodied in hardware, firmware, software, and combinations thereof, that enable the functionality of wireless node 20, 30 and the operability of the node 20, 30 on a wireless network. For example, processing subsystems allow for initiating and maintaining communications and exchanging data with other network apparatus. For the disclosed aspects, processing subsystems of processor 80 may include any subsystem used in conjunction with antenna configuration selection module 120 and related algorithms, sub-algorithms, modules, sub-modules thereof.

Computer platform 60 additionally includes a communications module (not shown in FIG. 4) embodied in hardware, firmware, software, and combinations thereof, that enables communications among the various components of the computing platform 60, as well as between the other networked apparatus. Thus, communication module may include the requisite hardware, firmware, software and/or combinations thereof for establishing and maintaining a network communication connection.

The antenna elements may be integrated in different hardware modules (e.g., four or eight antenna elements per module) and, as such, the antenna elements are fixed. In other embodiments, the antenna elements may be separated in logical groups, that are configurable by software in which the different antenna combinations (i.e., number of antenna elements) have different characteristics.

The memory 70 of wireless node 20, 30 stores or, in other embodiments, the processor 60 includes antenna configuration selection module 120 that is configured select a second antenna configuration 110-2 from amongst the plurality of antenna configurations 110 based, at least on, the signal quality 130 of a first wireless signal 40 received at the wireless node 20, 30 with a first antenna configuration 110-1. The selected antenna configuration 110-1 is used for transmitting and/or receiving a second wireless signal 50 with the antenna elements 90, 100.

The antenna configurations 110 will differ in accordance with at least one of (1) directional properties (i.e., the Angle of Arrival (AOA) and/or Angle of Departure (AOD) covered by the antenna configuration; (2) array gain obtained by correlated antenna elements (e.g., beamforming antenna configuration) in one-dimensional or two-dimensional antenna arrays; (3) the ability to support multiple beams simultaneously or multiple modes comprising two or more antenna elements simultaneously (e.g., MIMO antenna configuration), which affects polarization, uncorrelation and directivity of the antenna elements; and (4) the number of antenna elements and the degree of uncorrelation of the antenna elements.

Referring to FIG. 5 a flow diagram is presented of a method 200 for selecting antenna configuration in a wireless node that includes a plurality of antenna elements having a plurality of antenna configurations, in accordance with embodiments of the present invention. At Event 210, a first wireless signal is received at the wireless node with a first antenna configuration. As previous discussed, the wireless node may comprise a UE, an AP, a BS or the like. In specific embodiments of the invention, the first antenna configuration may be defined as a wide-coverage area antenna configuration.

At Event 220, a second antenna configuration is selected/determined from amongst the plurality of antenna configurations for transmitting and/or receiving a second wireless signal. The selection of the antenna configuration is based, at least on, a quality of the received wireless signal. As previously noted the selection process is an open loop process, in that, the selection/determination of the antenna configuration is conducted solely by the wireless node, absent other nodes assisting in the selection/determination process. In other words, in those embodiments in which the wireless node is a UE, the UE selects/determines the antenna configuration absent assistance from the base station, while in those embodiments in which the wireless node is an AP or BS, the AP or BS selects/determines the antenna configuration absent assistance from the UEs.

The quality of the signal may include one or more of the strength/power of the signal and/or the channel richness. Specifically, the strength of the signal, especially the strength of the signal in a straight forward direction indicates how much array gain is needed (i.e., how many simultaneously correlated antenna elements are needed).

Channel richness is a factor of the proximity of the wireless nodes (UE to BS) and the amount of scattering in the environment. In specific embodiments of the invention, in which the signal is determined to be strong, a single element per data stream (i.e., MIMO antenna configuration) may be implemented. The channel richness may be evaluated by transmission of pilot signals to see how many data streams the channel supports. If the channel supports a single data stream, the antenna configuration may be limited to a single antenna element or additional antenna elements may be implemented for diversity purposes (i.e., in a communication context, the channel may continuously be periodically probed by other antenna elements to detect changes). If the channel is determined to be rich, the channel supports multiple data streams (i.e., greater than two data stream) and multiple uncorrelated antenna elements are implemented. In other specific embodiments, in which the signal is determined to be weak, the array gain is increased by activating correlated antenna elements (i.e., achieving beamforming). The channel richness is evaluated by probing for additional reflections, if additional reflections are present additional beams are added. The additional beams may be included in the same antenna module or logical grouping or come from a different module or logical grouping.

In specific embodiments of the method when the wireless device switches from the first antenna configuration to the second antenna configurations the configurations have substantially the same coverage angles. While in other specific embodiments of the method, when the wireless device switches from the first antenna configuration to the second antenna configurations either the coverage angles of the second antenna configuration are substantially a sub-group of the coverage angles of the first antenna configuration or the coverage angles of the first antenna configuration are substantially a sub-group of the coverage angles of the second antenna configuration. This allows for wireless node to switch from one antenna module to another antenna module in order to cover different sectors of the cell (i.e., module diversity). In this regard, embodiments of the present invention serve to change the properties of the antenna while covering the same coverage angles or at least substantially overlapping coverage angles.

In specific embodiments of the method, the antenna configurations may include two or more of (1) a wide-coverage area antenna configuration, (2) a MIMO antenna configuration, and (3) a beamforming (BF) antenna configuration. The wide-coverage area antenna configuration implements one, or at most a few of the plurality antenna elements configured in a wide-coverage area pattern. In specific embodiments of the invention, the wide-coverage area antenna configuration may include a configuration that targets an omni-directional pattern. Such an omni-directional pattern may be targeted by the use of multiple antenna modules simultaneously, with each of the modules having a single or, in some instances a few, antenna elements activated. The MIMO antenna configuration implements a plurality of uncorrelated antenna elements that are configured to support multiple wireless data signals simultaneously over a single wireless channel by multipath propagation. The BF configuration implements a plurality of correlated antenna elements that are configured to transmit and receive the same data with phase offset. As such, embodiments of the method may be implemented in a mm-wave frequency band communication system, e.g., frequencies above 6 GHz, specifically 28 GHz.

In addition to selecting the antenna configuration based on quality of signal, other factors may implemented in the selection process. For example, the selection may be further based on (i) wireless node mobility status, and (ii) the interference state.

Wireless node mobility status may be defined as a wireless node being permanently stationary (e.g., TOT sensors or the like), temporary stationary, and moving at a specified rate/speed (e.g., low speed, high or the like) or the like. Mobility status may affect the number of antenna elements implemented. For example, beamforming may typically use less than all of the correlated antenna elements (e.g., 50% of the correlated antenna elements; however, if the wireless node is stationary it may beneficial, from a power consumption standpoint, to use all of the correlated antenna elements with more directed beams (commonly referred to as "pencil beams"). When the wireless node is mobile, beamforming that uses less than all of the correlated antenna elements with wider beams may be preferred. While such a configuration may result in use of more current (based on the wider beams), use of less correlated antenna elements will have the advantage of requiring less in terms of beam management (i.e., more robustness).

The interference state may affect the directivity of the beam and/or the array gain. If interference is present, a narrower (i.e., more directed) beam may offset the interference by spatial filtering of the channel. Additionally, in a high scattering and high interference environment a high array gain may be preferred as opposed to uncorrelated antenna elements or MIMO antenna configuration. For example, in state of high interference and/or high mobility, a narrow beam listening in a single direction may be preferred.

Thus, according to embodiments of the present invention, antenna elements are selected with various different properties. These properties include, but are not limited to (i) respective directional properties of the antenna elements adapted according to the respective antenna configuration, (ii) a respective array gain obtained by correlated antenna elements in the respective antenna configuration, (iii) the ability of the antenna configuration to support multiple beams simultaneously (or multiple modes including two or more antenna elements simultaneously and/or (iv) the volume of antenna elements and the level of uncorrelation of the antenna elements.

Referring to FIG. 6 a more detailed flow diagram is present of a method 300 for antenna configuration selection, in accordance with specific embodiments of the invention. At Event 302, cellular network access is initiated (e.g., paging or the like), at a UE, using a wide-coverage area antenna configuration. The wide-coverage area antenna configuration may utilize one or a minimal number of antenna elements and a single A/D converter. Thus, the wide-coverage area antenna configuration limits the amount of current used in the UE. At Event 210, a first wireless signal is received at the UE.

At Event 220, the antenna configuration is selected/determined by the UE based on the signal quality of the first wireless signal. Specifically, at Decision 304, a determination is made as to whether the quality of the first wireless signal meets a signal quality threshold. If the signal quality of the first wireless signal is determined to meet or exceed the signal quality threshold, at Event 306, MIMO antenna configuration is set. In specific embodiments of the invention, the UE is configured to prioritize the MIMO antenna configuration based on the signal quality of the first wireless signal meeting or exceeding the signal quality threshold. In other embodiments of the invention, requesting the MIMO antenna configuration includes transmits a request to the BS for MIMO antenna configuration.

At Decision 310, a determination is made as to whether the channel supports the MIMO antenna configuration. Either the system is configured to inherently support MIMO or the wireless node/UE needs to request MIMO transmissions at the network-level. If the channel is determined to support the MIMO antenna configuration, at Event 314, MIMO transmissions ensue, in which a plurality of uncorrelated antenna elements are configured to support multiple wireless data signals simultaneously over a single wireless channel by multipath propagation. In other words, all antenna elements essentially receive the same signals and the different data streams are associated with different signal levels to the different antenna elements (i.e., different gain and phase profile). If the channel is determined to not support the MIMO antenna configuration, at Event 316, a Single Input, Single Output (SISO) transmission or a single data stream ensues.

If the signal quality of the first wireless signal is determined to fall below the signal quality threshold, at Event 308, the antenna configuration is set (i.e., correlated antenna elements are used to form a beam) and a beam management procedure is executed, which entails synchronizing the beams between the BS and the UE so that the beams are directed toward each other and searching for alternative beams). At Event 312, as a result of executing the beam management procedure and, more specifically, searching for additional beams candidates, a decision is made as to whether the channel supports the MIMO antenna configuration (i.e., whether additional beams candidates are available). If the channel is determined to not support the MIMO antenna configuration, meaning only one beam was determined to be available, at Event 320, at least one beam with a single data stream is managed. If the channel is determined to support MIMO antenna configuration, meaning multiple beams were determined to be available, at Event 318, multiple beams are managed with different data streams.

FIGS. 7-9 provide schematic diagrams of antenna modules 400 configured for wide-coverage area antenna configuration (FIG. 7), beamforming antenna configuration (FIG. 8) and MIMO antenna configuration (FIG. 9) in a receiver, in accordance with embodiments of the present invention. The same principles discussed in relation to the antenna configuration in the receiver chain would equally apply in a transmission chain. The antenna modules 400A, 400B, 400C and 400D, each comprise four antenna elements 402. It should be noted that in other embodiments of the invention, the antenna module comprises more or less antenna elements 402. In the illustrated embodiments of FIGS. 7-9, which are by way of example only, each module 400 includes an A/D converter 404, which is in communication with a filter 406 and a mixer 408, which mixes the signal down to low frequency using local oscillator 410. Switches 412 and 416 are implemented to change between the wide-coverage area antenna configuration of FIG. 7 and the BF antenna configuration of FIG. 8. For example, in FIG. 7, in the downlink, a signal 422 undergoes A/D conversion, filtering and mixing and is communicated to the phase shifter 418 and amplifier/damper 420 associated with the top-most antenna element 402A in the module 400A, which transmitted the signal 422. In this embodiment only the one single antenna element 402A is implemented with a wide-coverage area pattern.

In FIG. 8, all of the antenna elements 402A, 402B, 402C and 402D of a single module 400A are implemented in the BF antenna configuration. In the downlink scheme, the combiner/multiplexer 414 is implemented to multiplex the signal 422 into four components 422A, 422B, 422C and 422D, which are communicated to respective phase shifters 418 and amplifiers 420 prior to communication/transmission of the signals 422A, 422B, 422C and 422D via corresponding antenna elements 402A, 402B, 402C and 402D. In other embodiments of the invention, the BF antenna configuration may implement less than all of the antenna elements within module 400A.

In FIG. 9, one antenna element 402A from each of the modules 400A, 400B, 400C and 400D is implemented for spatial diversity (i.e., MIMO antenna configuration). While the illustrated embodiment of FIG. 9 shows only one antenna element 402A from each of the antenna modules 400A, 400B, 400C and 400D, in other embodiments of the invention, the MIMO antenna configuration may implement more than one antenna element from at least two of the antenna modules and the antenna element(s) that are implemented from each of the modules are not required to be in the same position within the module. As such, in the MIMO antenna configuration, at least two antenna modules are implemented (i.e., at least two A/D converters are implemented).

Thus, systems, devices, methods, computer program products and the like described above provide for open loop selection of antenna configuration by wireless nodes that comprise a plurality of antenna elements adapted for a plurality of different antenna configurations. The selection of the antenna configuration is made based on the quality of signal(s) received by the wireless node. In specific embodiments of the invention, the wireless nodes are operable for communication in the mm-wave frequency band and the different antenna configurations include two or more of a wide-coverage area antenna configuration, a Multiple-Input Multiple-Output (MIMO) configuration and a Beamforming (BF) configuration.

Each processor, BS and/or UE described herein generally includes circuitry for implementing audio, visual, and/or logic functions. For example, the processor/BS/UE may include a digital signal processor device, a microprocessor device, and various analog-to-digital converters, digital-to-analog converters, and other support circuits. Control and signal processing functions of the system in which the processor resides may be allocated between these devices according to their respective capabilities. The processor/BS/UE may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, computer-implemented process, and/or the like), or as any combination of the foregoing. Accordingly, embodiments of the present invention may take the form of an entirely an entirely software embodiment (including firmware, resident software, micro-code, stored procedures, etc.), an entirely hardware embodiment, or an embodiment combining software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block (s).

The one or more computer-executable program code portions may be stored in a non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for antenna configuration of a wireless node, wherein the wireless node comprises a plurality of antenna elements adaptive for a plurality of antenna configurations, the method comprising:
   receiving a first wireless signal with a first antenna configuration; and
   selecting a second antenna configuration from amongst the plurality of antenna configurations for transmitting and/or receiving a second wireless signal with at least one of the antenna elements based on a quality of the first wireless signal,
   wherein coverage angles of the first antenna configuration are substantially a sub-group of coverage angles of the second antenna configuration,
   wherein the quality of the first wireless signal is defined by a channel richness associated with an amount of scattering of the first wireless signal,
   wherein the channel richness associated with the amount of scattering of the first wireless signal is used to determine a number of data streams supported by a channel for communication by the wireless node, and wherein the second antenna configuration for transmitting and/or receiving the second wireless signal is selected based on the number of data streams supported by the channel.

2. The method of claim 1, wherein the first antenna configuration is further defined as a wide-coverage area antenna configuration.

3. The method of claim 1, wherein the first and second antenna configurations have substantially same coverage angles.

4. The method of claim 1, wherein the plurality of antenna configurations comprise at least two of a wide-coverage area antenna configuration, a Multiple Input Multiple Output, MIMO antenna configuration and a beamforming antenna configuration.

5. The method of claim 4, wherein the wide-coverage area antenna configuration implements one or more of the antenna elements configured in a wide-coverage area pattern.

6. The method of claim 4, wherein the MIMO antenna configuration implements a plurality of uncorrelated antenna elements that are configured to support multiple wireless data signals simultaneously over a single wireless channel by multipath propagation.

7. The method of claim 4, wherein the beamforming antenna configuration implements a plurality of correlated antenna elements that are configured to transmit and receive same signal with phase offset.

8. The method of claim 1, wherein the quality of the first wireless signal is further defined by a strength of the first wireless signal.

9. The method of claim 1, wherein selecting the second antenna configuration further comprises selecting second the antenna configuration based on a mobility status of the wireless node.

10. The method of claim 1, wherein selecting the second antenna configuration further comprises selecting the second antenna configuration based on an interference state affecting the wireless node.

11. The method of claim 1, wherein selecting the second antenna configuration further comprises selecting the first antenna configuration for uplink transmissions and selecting the second antenna configuration for downlink transmissions.

12. The method of claim 1, wherein selecting the second antenna configuration further comprises selecting the first antenna configuration and the second antenna configuration, and wherein the first and second antenna configurations are different antenna configurations.

13. The method of claim 1, further comprising:
initiating, at a UE, network access with a base station using a wide-coverage area antenna configuration; and
receiving the first wireless signal using the wide-coverage area antenna configuration.

14. The method of claim 1, wherein selecting the second antenna configuration further comprises determining the quality of the first wireless signal by determining whether the quality of the first wireless signal meets or exceeds a signal quality threshold.

15. The method of claim 14, wherein selecting the second antenna configuration further comprises, in response to determining that the quality of the first wireless signal fails to meet or exceed the signal quality threshold, selecting an array antenna configuration and executing a beam management process.

16. The method of claim 15, wherein selecting the second antenna configuration further comprises, in response to selecting the array antenna configuration, determining whether a channel supports multiple beams.

17. The method of claim 14, wherein selecting the second antenna configuration further comprises, in response to determining that the quality of the first wireless signal meets or exceeds a predetermined signal strength threshold, selecting a Multiple Input Multiple Output, MIMO antenna configuration.

18. A wireless node apparatus comprising:
a processing device;
a memory;
a plurality of antenna elements adaptive for a plurality of antenna configurations; and
an antenna configuration selection module, either included in the processing device, or stored in the memory and executable by the processing device and configured to:
select a second antenna configuration from amongst the plurality of antenna configurations for transmitting and/or receiving a second wireless signal with the antenna elements based on a quality of a first wireless signal received with a first antenna configuration,
wherein coverage angles of the first antenna configuration are substantially a sub-group of the coverage angles of the second antenna configuration,
wherein the quality of the first wireless signal is defined by a channel richness associated with an amount of scattering of the first wireless signal,
wherein the channel richness associated with the amount of scattering of the first wireless signal is used to determine a number of data streams supported by a channel for communication by the wireless node, and
wherein the second antenna configuration for transmitting and/or receiving the second wireless signal is selected based on the number of data streams supported by the channel.

19. A computer program product for selecting antenna configuration of a wireless node the computer program product comprising at least one non-transitory computer readable medium comprising computer readable instructions, the instructions comprising computer readable instructions for:
receiving a first wireless signal with a first antenna configuration from amongst a plurality of antenna configurations; and
selecting a second antenna configuration from amongst the plurality of antenna configurations for transmitting and/or receiving a second wireless signal with at least one of a plurality antenna elements based on a quality of the first wireless signal,
wherein coverage angles of the first antenna configuration are substantially a sub-group of the coverage angles of the second antenna configuration,
wherein the quality of the first wireless signal is defined by a channel richness associated with an amount of scattering of the first wireless signal,
wherein the channel richness associated with the amount of scattering of the first wireless signal is used to determine a number of data streams supported by a channel for communication by the wireless node, and
wherein the second antenna configuration for transmitting and/or receiving the second wireless signal is selected based on the number of data streams supported by the channel.

* * * * *

UNITED STATES PATENT AND TRADEMARK OFFICE
CERTIFICATE OF CORRECTION

PATENT NO. : 11,134,395 B2
APPLICATION NO. : 16/621138
DATED : September 28, 2021
INVENTOR(S) : Bengtsson et al.

Page 1 of 1

It is certified that error appears in the above-identified patent and that said Letters Patent is hereby corrected as shown below:

In the Claims

Column 20, Line 53, Claim 19:
Please correct "of the coverage angles" to read -- of coverage angles --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*